(12) United States Patent
Hamaguchi (10) Patent No.: US 10,946,929 B2
(45) Date of Patent: Mar. 16, 2021

(54) OPERATION APPARATUS

(71) Applicant: Honda Motor Co., Ltd., Tokyo (JP)

(72) Inventor: Daiki Hamaguchi, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/368,475

(22) Filed: Mar. 28, 2019

(65) Prior Publication Data

US 2019/0300101 A1 Oct. 3, 2019

(30) Foreign Application Priority Data

Mar. 29, 2018 (JP) .............................. JP2018-064877

(51) Int. Cl.
| | |
|---|---|
| *B62L 3/04* | (2006.01) |
| *B60T 7/04* | (2006.01) |
| *G05G 5/05* | (2006.01) |
| *G05G 1/30* | (2008.04) |
| *B60T 7/06* | (2006.01) |

(Continued)

(52) U.S. Cl.
CPC .................. *B62L 3/04* (2013.01); *B60T 7/06* (2013.01); *B60T 11/18* (2013.01); *G05G 1/44* (2013.01); *G05G 5/05* (2013.01)

(58) Field of Classification Search
CPC ..... B62L 3/04; B60T 7/04; B60T 7/06; B60T 11/18; B62J 25/00; G05G 1/30; G05G 1/44; G05G 1/445; G05G 5/03; G05G 5/05

See application file for complete search history.

(56) References Cited

U.S. PATENT DOCUMENTS 5,622,358 A * 4/1997 Komura .................. F16F 1/328
267/166
6,276,229 B1 * 8/2001 Gohring ............... B60K 26/021
74/513

(Continued)

FOREIGN PATENT DOCUMENTS

| CN | 105984545 A | 10/2016 | |
|---|---|---|---|
| EP | 3069981 A1 * | 9/2016 | ................ B60T 7/10 |

(Continued)

OTHER PUBLICATIONS

Japanese Office Action, dated Sep. 4, 2019, for Japanese Application No. 2018-064877, with an English translation.

*Primary Examiner* — Adam D Rogers
(74) *Attorney, Agent, or Firm* — Birch, Stewart, Kolasch & Birch, LLP (57) ABSTRACT

An operation apparatus includes a supporting element, an operation element including an arm whose basal end is rotatably supported by the supporting element and whose tip is provided with an acting element, and a return spring provided between the supporting element and the operation element, in which the return spring is housed in a compact manner without inviting an increase in the number of components. A return spring is provided between a first spring holder and a second spring holder. A supporting element is provided with a first side wall opposing the return spring in the lateral direction. An arm is provided with a second side wall opposing the first side wall and surrounding the return spring in conjunction with the first spring holder, the second spring holder, and the first side wall.

10 Claims, 4 Drawing Sheets

(51) Int. Cl.
   *B60T 11/18*   (2006.01)
   *G05G 1/44*   (2008.04)

(56) References Cited

U.S. PATENT DOCUMENTS

| | | | | |
|---|---|---|---|---|
| 8,464,604 | B2* | 6/2013 | Watanabe | B60K 26/02 |
| | | | | 74/513 |
| 8,596,162 | B2* | 12/2013 | Nozu | B60K 26/021 |
| | | | | 74/512 |
| 8,939,045 | B2* | 1/2015 | Yamaguchi | B60T 7/06 |
| | | | | 74/512 |
| 10,112,484 | B2* | 10/2018 | Chapman | G05G 1/44 |
| 10,137,874 | B2* | 11/2018 | Pennala | B60T 7/042 |
| 2007/0137400 | A1 | 6/2007 | Campbell | |
| 2013/0167526 | A1 | 7/2013 | Yoshizawa et al. | |

FOREIGN PATENT DOCUMENTS

| | | | | |
|---|---|---|---|---|
| GB | 1558282 | A * | 12/1979 | B60T 7/04 |
| JP | 2012-121458 | A | 6/2012 | |
| JP | 5715557 | B2 | 5/2015 | |
| WO | WO-9929548 | A1 * | 6/1999 | B60T 7/042 |

* cited by examiner

OPERATION APPARATUS

BACKGROUND

1. Technical Field

The present invention relates to an operation apparatus including a supporting element, an operation element, and a return spring, the operation element including an arm whose basal end is rotatably supported by the supporting element and whose tip is provided with an acting element, the return spring being provided between the supporting element and the operation element.

2. Description of the Background

A Patent Literature 1 discloses a known structure of a rear wheel brake operation apparatus for a motorcycle. The structure accumulates the reaction force corresponding to compression of a return spring which is a coil spring in accordance with a braking operation executed with a brake pedal. The return spring then returns the brake pedal to the original position in response to cancellation of the braking operation.

CITATION LIST

Patent Literature

Patent Literature 1: Japanese Patent Publication No. 5715557

BRIEF SUMMARY

The structure disclosed in the Patent Literature 1 uses a coil spring as the return spring. Therefore, in order to obtain desired reaction force in response to a braking operation executed with the brake pedal, the coil spring must have a great cross-section and a great length in its expansion-compression direction. This necessitates not only great space for disposing the return spring but also a retainer and the like for preventing the return spring from falling, increasing the number of components.

The present invention has been made in view of the foregoing, and an object thereof is to provide an operation apparatus including a return spring disposed in a compact manner, without inviting an increase in the number of components.

In order to achieve the object, the first aspect of the present invention provides an operation apparatus including: a supporting element; an operation element including an arm whose basal end is rotatably supported by the supporting element and whose tip is provided with an acting element; and a return spring provided between the supporting element and the operation element. The return spring, which is a wave spring, is provided between a first spring holder provided at the supporting element and a second spring holder provided at the arm. The supporting element is provided with a first side wall opposing the return spring in a lateral direction. The arm is provided with a second side wall opposing the first side wall and surrounding the return spring in conjunction with the first spring holder, the second spring holder, and the first side wall.

In the second aspect of the present invention, in addition to the structure of the first aspect, the return spring is a wave spring whose radial direction width becomes greater than its expansion-compression direction length when compressed.

In the third aspect of the present invention, in addition to the structure of the second aspect, the return spring is provided between the supporting element and the operation element having its expansion-compression direction oriented in a tangent direction of a virtual arc about a rotation axis line of the operation element.

In the fourth aspect of the present invention, in addition to the structure of the third aspect, the arm is plate-like, and the second side wall extending in a radial direction relative to a rotation axis line of the arm is integrated with the arm.

In the fifth aspect of the present invention, in addition to the structure of the fourth aspect, the supporting element is provided with a recess housing part of the return spring.

In the sixth aspect of the present invention, in addition to the structure of any one of the first to fifth aspects, the supporting element is a step-use stay fixed to a vehicle body frame of a saddled vehicle. The step-use stay supports a step disposed on an outer side in a vehicle width direction of the step-use stay. The step-use stay is provided with, on an inner side in the vehicle width direction of the step-use stay, a pedal shaft rotatably supporting the operation element being a brake pedal. The return spring is provided between the operation element and the step-use stay on the inner side in the vehicle width direction of the step-use stay.

In the first aspect of the present invention, by virtue of using a wave spring as the return spring, the reduced space for the return spring will suffice. Additionally, the return spring being surrounded by the first spring holder, the second spring holder, the first side wall, and the second side wall eliminates the necessity for providing any dedicated components for preventing the return spring from coming off. Hence, the return spring is disposed in a compact manner without inviting an increase in the number of components. In particular, the wave spring easily attains a great maximum diameter as compared to a conventional coil spring, and the return spring is surely compressed by the first and second spring holders.

In the second aspect of the present invention, use of the wave spring whose radial direction width becomes greater than its expansion-compression direction length when compressed prevents the return spring from buckling. Further, this structure downsizes the second side wall which has the return spring interposed relative to the first side wall in the radial direction of the return spring.

In the third aspect of the present invention, the expansion-compression direction of the return spring is oriented in the tangent direction of the virtual arc about the rotation axis line of the operation element. Thus, the reaction force corresponding to the operational force applied to the operation element efficiently occurs at the return spring, contributing to downsizing the return spring. Further, the deflection amount in the compression direction of the return spring corresponding to the operation amount of the operation element is easily set, broadening the scope of selection of the wave spring.

In the fourth aspect of the present invention, the second side wall extending in the radial direction relative to the rotation axis line of the arm is integrated with the plate-like arm. This structure provides excellent relative positional precision of the second side wall relative to the rotation axis line of the arm. Further, this structure reduces the clearance between the supporting element and the arm. Thus, the supporting element and the arm are disposed in a compact manner in the direction along the rotation axis line of the arm while the return spring is further effectively prevented from coming off.

In the fifth aspect of the present invention, the supporting element is provided with the recess housing part of the return spring. This facilitates the compact disposition of the supporting element and the arm in the direction along the rotation axis line of the arm.

In the sixth aspect of the present invention, the return spring is provided between the operation element and the step-use stay on the inner side in the vehicle width direction of the step-use stay fixed to the vehicle body frame of the saddled vehicle so as to support the step. Thus, the return spring is protected without inviting an increase in the number of components when this structure is applied to an operation apparatus for executing a braking operation on the rear wheel of a saddled vehicle.

DETAILED DESCRIPTION

With reference to FIGS. 1 to 4, a description will be given of an embodiment of the present invention. In the following description, front and rear, right and left, and top and bottom directions refer to the rider's view on a motorcycle.

Figure 1:
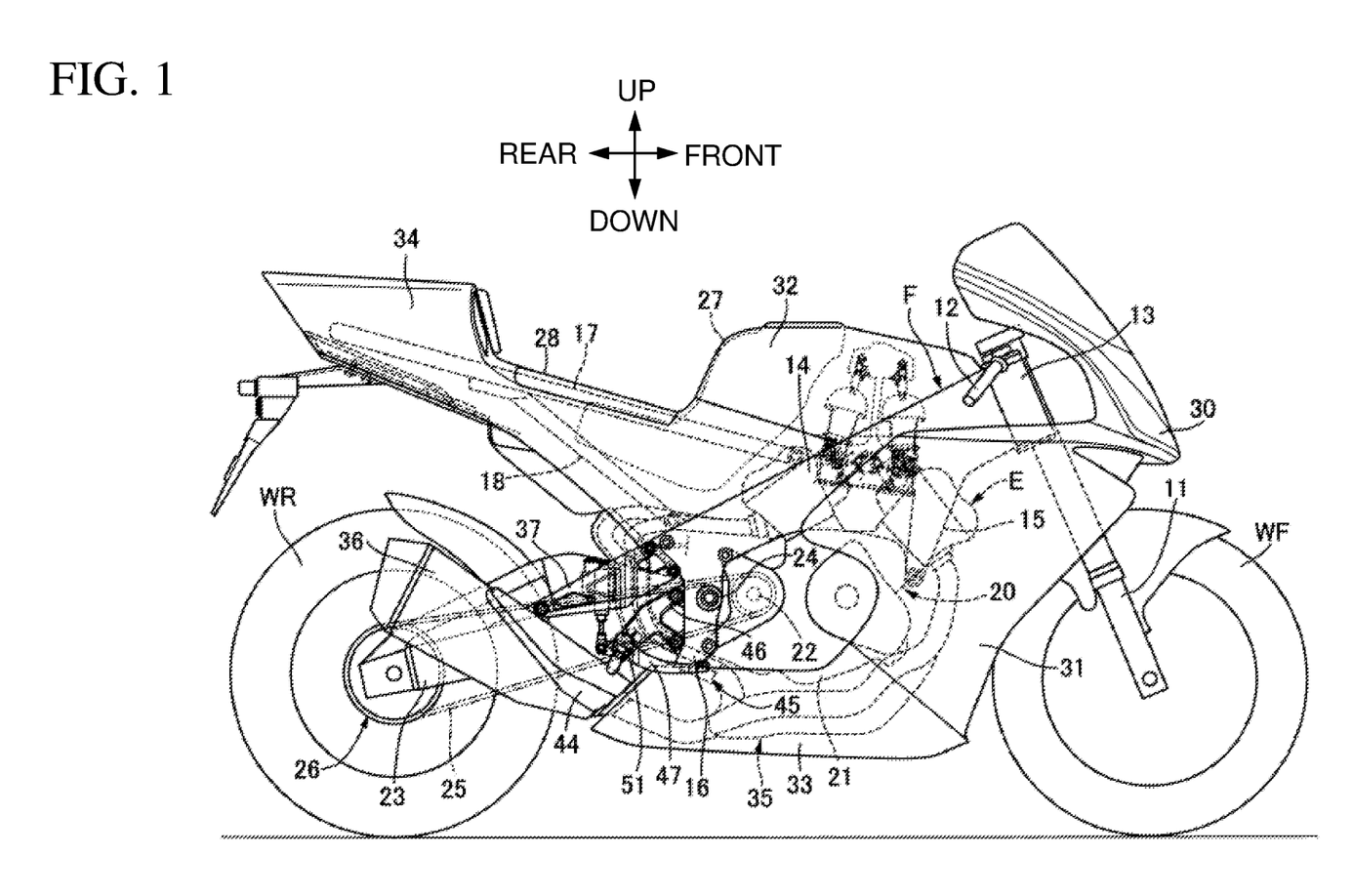
FIG. 1 is a right side view of a motorcycle.

Firstly, in FIG. 1, a vehicle body frame F of a motorcycle which is a saddled vehicle includes: a head pipe 13 steerably supporting a front fork 11 axially supporting a front wheel WF at its lower end and a steering handle 12 coupled to the front fork 11; a right and left pair of main frames 14 extending rearward downward from the head pipe 13; a right and left pair of down frames 15 extending rearward downward from the front part of the main frames 14 by an angle sharper than the inclination angle of the main frames 14; a right and left pair of pivot frames 16 continuously integrated with the rear end of the main frames 14 and extending downward; a right and left pair of seat rails 17 having their front ends coupled to the intermediate parts in the front-rear direction of the main frames 14; and a right and left pair of auxiliary frames 18 having their front ends connected to the rear ends of the main frames 14 and extending rearward upward, and having their rear ends connected to the intermediate parts in the front-rear direction of the seat rails 17.

On the vehicle body frame F, an engine body 20 of an engine E that produces power for driving a rear wheel WR is mounted. In the present embodiment, the engine body 20 is a V4 engine. A crankcase 21 included in the engine body 20 houses a transmission mechanism (not shown). An output shaft 22 of the transmission mechanism is disposed so as to project laterally from the left side surface of the crankcase 21. Further, the pivot frames 16 of the vehicle body frame F swingably support, via a supporting shaft 24, the front end of a swingarm 23 axially supporting the rear wheel WR at its rear end. The rotary power from the output shaft 22 is transferred to the rear wheel WR via a transfer mechanism 26 including an endless drive chain 25.

Above the engine body 20, a fuel tank 27 supported by the main frames 14 is disposed. Further, the seat rails 17 of the vehicle body frame F support a riding seat 28 disposed on the rear obliquely upward side of the engine E. The fuel tank 27 has its rear part disposed below the riding seat 28.

The steering handle 12 and the head pipe 13 are partially covered with a front cowl 30 from the front side. The front part of the engine E is covered with a right and left pair of front side cowls 31 from the opposite sides in the vehicle width direction. The upper part of the engine E and the upper part of the fuel tank 27 are covered with a top cowl 32 from above and the opposite sides in the vehicle width direction. The lower part of the engine E is covered with lower side cowls 33 continuous to the front side cowls 31 from the opposite sides in the vehicle width direction. The rear part of the vehicle body frame F is covered with a rear cowl 34 continuous to the top cowl 32. The front cowl 30, the front side cowls 31, the top cowl 32, the lower side cowls 33, and the rear cowl 34 are supported by the vehicle body frame F.

Figure 2:
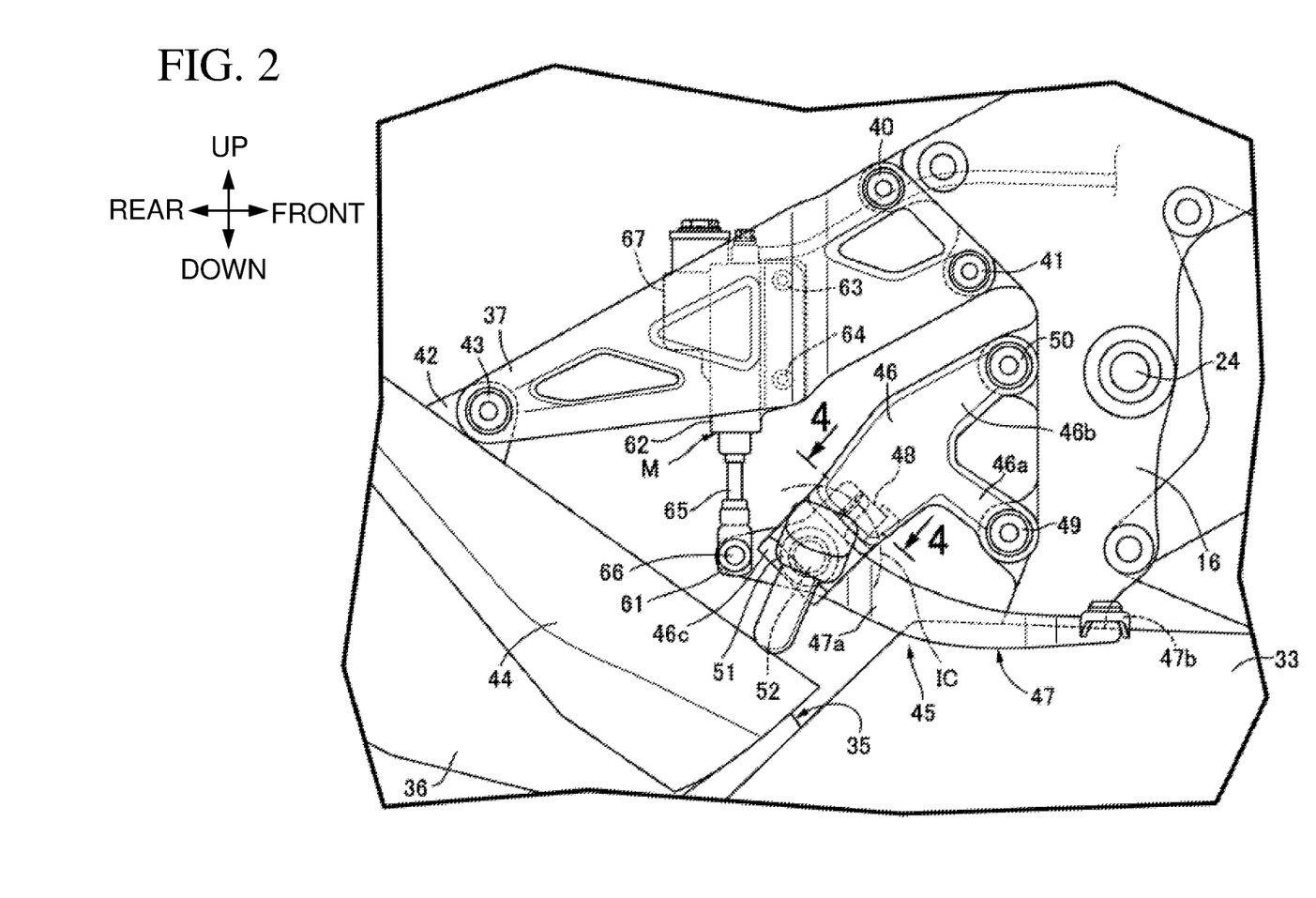
FIG. 2 is an enlarged main part view of FIG. 1.

With reference also to FIG. 2, an exhaust muffler 36 forming the downstream end of an exhaust apparatus 35 of the engine E is disposed on the right side relative to the rear wheel WR. The exhaust muffler 36 is supported by a muffler-use stay 37 mounted on the right one of the pivot frames 16.

The front end of the muffler-use stay 37 is mounted on the right one of the pivot frames 16 at two locations spaced apart from each other in the top-bottom direction with bolts 40, 41. An attachment-target plate 42 provided at the upper frontward position in the exhaust muffler 36 is fastened to the rear end of the muffler-use stay 37 with a bolt 43. Further, the front part of the exhaust muffler 36 is covered from above with a muffler cover 44 for blocking heat. The muffler cover 44 is supported by an exhaust muffler 36.

Figure 3:
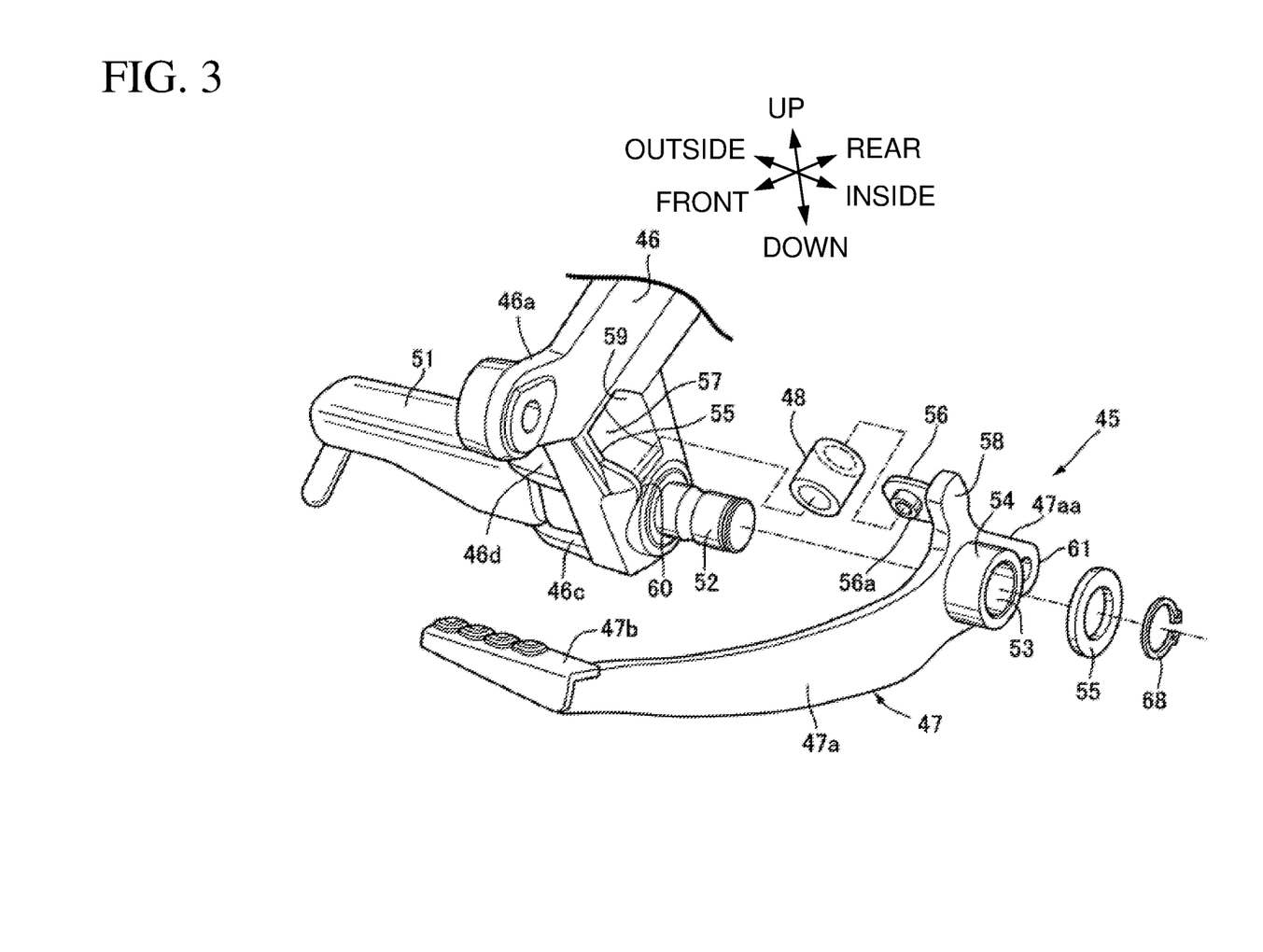
FIG. 3 is an exploded perspective view of a brake pedal and a step holder.

With reference also to FIG. 3, an operation apparatus 45 for executing a braking operation on the rear wheel WR is provided at the lower part of the right one of the pivot frames 16. The operation apparatus 45 includes: a step-use stay 46 which is a supporting element; a brake pedal 47 which is an operation element rotatably supported by the step-use stay 46; and a return spring 48 provided between the step-use stay 46 and the brake pedal 47.

To the pivot frames 16 of the vehicle body frame F, the step-use stay 46 disposed below the muffler-use stay 37 is fixed. That is, the step-use stay 46 integrally includes a lower mounting limb 46a extending in the vehicle front-rear direction, and an upper mounting limb 46b disposed above the lower mounting limb 46a while being inclined upward frontward so as to increase the distance frontward from the lower mounting limb 46a. The front end of the lower mounting limb 46a and the front end of the upper mounting limb 46b are attached to the lower parts of the pivot frames 16 with bolts 49, 50.

On the outer side in the vehicle width direction of the step-use stay 46, a step 51 on which the rider steps is disposed. At the lower part in the side surface on the outer side in the vehicle width direction of the step-use stay 46, a pair of supporting projections 46c, 46d project, rotatably supporting the step 51 between a folded position where the step 51 is folded on the step-use stay 46 side and a use position where the step 51 projects on the outer lateral side from the step-use stay 46.

The brake pedal 47 includes an arm 47a whose basal end is rotatably supported by the step-use stay 46 and whose tip is provided with an acting element 47b. A basal end 47aa of the arm 47a is disposed on the inner side in the vehicle width direction of the step-use stay 46 and rotatably supported by a pedal shaft 52 provided at the step-use stay 46. In the present embodiment, the pedal shaft 52 projects from and integrated with the step-use stay 46.

With the basal end 47aa of the arm 47a, a supporting sleeve 54 forming a supporting hole 53 is integrated. To a projecting end of the pedal shaft 52 inserted into the supporting hole 53 and projecting from the supporting sleeve 54, a substantially C-shaped stop ring 68 is attached with a ring-like washer 55 interposed relative to the tip of the supporting sleeve 54.

The arm 47a is plate-like and extends in the front-rear direction in a curved manner, so that the basal end 47aa supported by the pedal shaft 52 is disposed on the inner side in the vehicle width direction of the step-use stay 46, whereas the acting element 47b provided at the tip of the arm 47a is disposed in front of the step 51 on the outer side in the vehicle width direction of the step-use stay 46.

Figure 4:
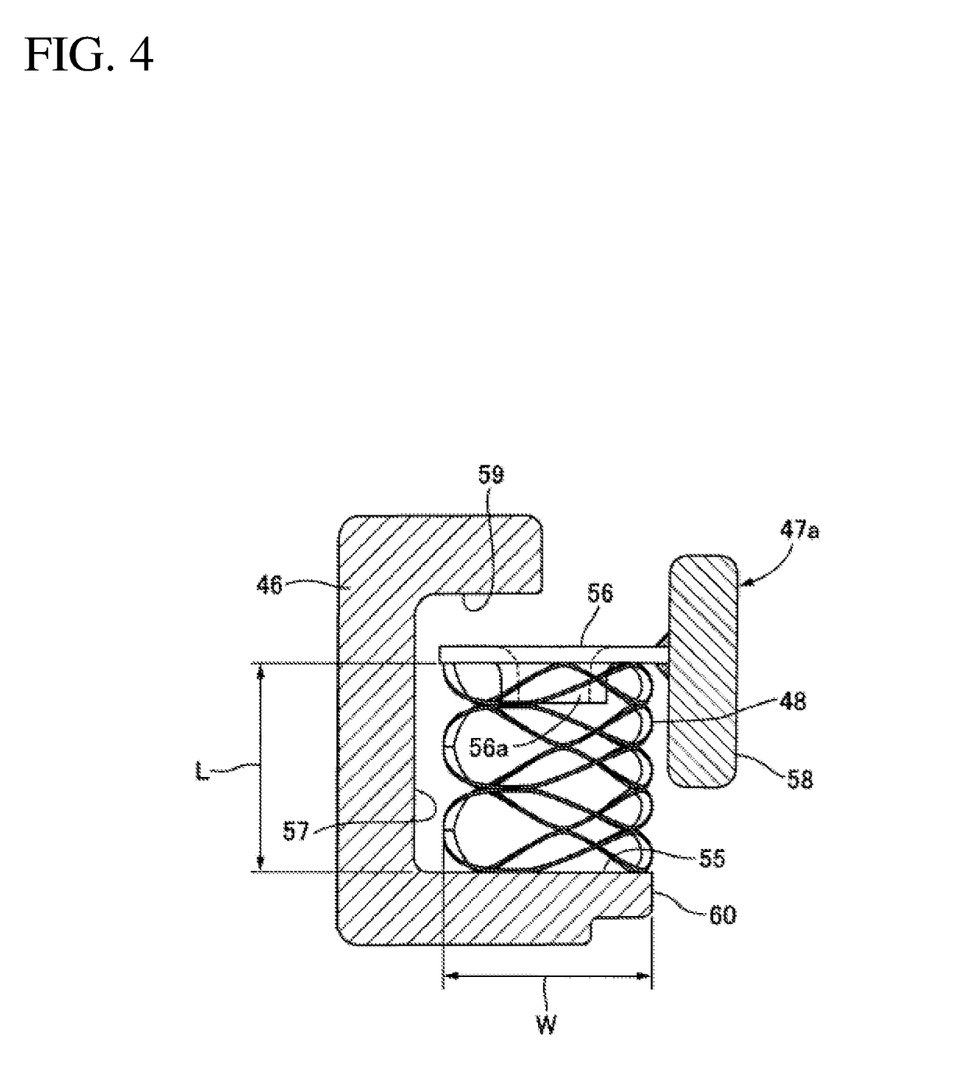
FIG. 4 is a cross-sectional view taken along line 4-4 in FIG. 2.

With reference also to FIG. 4, the return spring 48 is a wave spring whose radial direction width W becomes greater than its expansion-compression direction length L when compressed. The return spring 48 is disposed between the step-use stay 46 and the brake pedal 47, having its expansion-compression direction oriented in the tangent direction of the virtual arc IC (see FIG. 2) about the rotation axis line of the brake pedal 47, that is, the axis line of the pedal shaft 52.

The return spring 48 is provided between a first spring holder 55 provided at the step-use stay 46 and a second spring holder 56 provided at the arm 47a. The step-use stay 46 is provided with a first side wall 57 opposing the return spring 48 in the lateral direction. The arm 47a is provided with a second side wall 58 opposing the first side wall 57 so as to surround the return spring 48 in conjunction with the first spring holder 55, the second spring holder 56, and the first side wall 57.

At the side surface on the inner side in the vehicle width direction of the step-use stay 46, a quadrangular recess 59 elongated in the top-bottom direction is formed above the pedal shaft 52, in which the first side wall 57 is the closed end wall of the recess 59. The return spring 48 is partially housed in the recess 59. Further, a projection 60 forming the first spring holder 55 in conjunction with part of the lower wall of the recess 59 projects at the side surface on the inner side in the vehicle width direction of the step-use stay 46. The upper surface of the projection 60 is flush with the upper surface of the lower wall of the recess 59.

The second side wall 58 is integrated with the arm 47a while extending in the radial direction relative to the rotation axis line of the arm 47a, that is, the axis line of the pedal shaft 52. In the present embodiment, the second side wall 58 extends upward from the basal end 47aa of the arm 47a.

The second spring holder 56 is provided by welding or the like at the tip of the second side wall 58 so as to partially positioned in the recess 59. At the second spring holder 56, a short sleeve 56a fitting with the upper part of the return spring 48 integrally projects.

Further, the arm 47a in the brake pedal 47 is provided with a coupling limb 61 integrally projecting rearward from the basal end 47aa of the arm 47a. On the other hand, at the muffler-use stay 37, a cylinder body 62 of a master cylinder M having an axis line extending in the top-bottom direction is supported by a pair of bolts 63, 64 disposed at locations spaced apart from each other in the top-bottom direction. A pushrod 65 of the master cylinder M extends downward from the cylinder body 62 and is coupled to the coupling limb 61 via a coupling pin 66. Further, the cylinder body 62 is provided with a reservoir 67.

Next, a description will be given of the operation of the present embodiment. The operation apparatus 45 includes: the step-use stay 46 which is a supporting element; the brake pedal 47 as an operation element including the arm 47a whose basal end 47aa is rotatably supported by the step-use stay 46 and whose tip is provided with the acting element 47b; and the return spring 48 provided between the step-use stay 46 and the brake pedal 47. The return spring 48 which is a wave spring is provided between the first spring holder 55 provided at the step-use stay 46 and the second spring holder 56 provided at the arm 47a. The step-use stay 46 is provided with the first side wall 57 opposing the return spring 48 in the lateral direction. The arm 47a is provided with the second side wall 58 opposing the first side wall 57 and surrounding the return spring 48 in conjunction with the first spring holder 55, the second spring holder 56, and the first side wall 57. Thus, the reduced space for the return spring 48 will suffice. Additionally, the return spring 48 being surrounded by the first spring holder 55, the second spring holder 56, the first side wall 57, and the second side wall 58 eliminates the necessity for providing any dedicated components for preventing the return spring 48 from coming off. Hence, the return spring 48 is disposed in a compact manner without inviting an increase in the number of components. In particular, the wave spring easily attains a great maximum diameter as compared to a conventional coil spring, and the return spring 48 is surely compressed by the first and second spring holders 55, 56.

By virtue of the return spring 48 being a wave spring whose radial direction width W becomes greater than its expansion-compression direction length L when compressed, the return spring 48 is prevented from buckling. Further, this structure downsizes the second side wall 58 which has the return spring 48 interposed relative to the first side wall 57 in the radial direction of the return spring 48.

The return spring 48 is provided between the step-use stay 46 and the brake pedal 47 having its expansion-compression direction oriented in the tangent direction of the virtual arc IC about the rotation axis line of the brake pedal 47. Thus, the reaction force corresponding to the operational force applied to the brake pedal 47 efficiently occurs at the return spring 48, contributing to downsizing the return spring 48. Further, the deflection amount in the compression direction of the return spring 48 corresponding to the operation amount of the brake pedal 47 is easily set, broadening the scope of selection of the wave spring.

Further, the second side wall 58 extending in the radial direction relative to the rotation axis line of the arm 47a is integrated with the plate-like arm 47a. This structure provides excellent relative positional precision of the second side wall 58 relative to the rotation axis line of the arm 47a. Further, this structure reduces the clearance between the step-use stay 46 and the arm 47a. Thus, the step-use stay 46 and the arm 47a are disposed in a compact manner in the direction along the rotation axis line of the arm 47a while the return spring 48 is further effectively prevented from coming off.

Still further, the recess 59 housing part of the return spring 48 is formed at the side surface on the inner side in the vehicle width direction of the step-use stay 46. This facilitates the compact disposition of the step-use stay 46 and the arm 47a in the direction along the rotation axis line of the arm 47a.

Still further, the step-use stay 46 fixed to the vehicle body frame F of the motorcycle which is a saddled vehicle supports the step 51 disposed on the outer side in the vehicle width direction of the step-use stay 46. The pedal shaft 52 disposed on the inner side in the vehicle width direction of the step-use stay 46 to rotatably support the brake pedal 47 is provided. The return spring 48 is provided between the brake pedal 47 and the step-use stay 46 on the inner side in the vehicle width direction of the step-use stay 46. Thus, the return spring 48 is protected without inviting an increase in the number of components when this structure is applied to the operation apparatus 45 for executing a braking operation on the rear wheel of a motorcycle.

In the foregoing, a description has been given of the embodiment of the present invention. Here, the present invention is not limited to the embodiment, and various changes can be made without departing from the scope of the present invention recited in the claims.

For example, in the embodiment, the description has been exemplarily given of the operation apparatus for executing a braking operation on the rear wheel of a motorcycle. Here, the present invention is widely applicable to an operation apparatus including a return spring provided between a supporting element rotatably supporting an operation element and the operation element.

REFERENCE SIGNS LIST

46: step-use stay which is supporting element
47: brake pedal which is operation element
47a: arm
47aa: basal end of arm
47b: acting element
48: return spring
51: step
52: pedal shaft
55: first spring holder
56: second spring holder
57: first side wall
58: second side wall
59: recess
IC: virtual arc
L: expansion-compression direction length of wave spring
W: width in radial direction of wave spring

What is claimed is:

1. An operation apparatus comprising:
    a return spring that is a wave spring;
    a supporting element including:
        a first side wall opposing the return spring in a lateral direction; and
        a first spring holder; and
    an operation element including:
        an arm including:
            a basal end rotatably supported by the supporting element;
            a second spring holder;
            a second side wall being planar and having an inner surface facing the first side wall; and
            an acting element disposed at a tip of the arm,
    wherein the return spring is surrounded with the first spring holder, the second spring holder, the first side wall, and the second side wall,
    wherein the first side wall and the second side wall extend in a first direction and are spaced from each other in a second direction,
    wherein the first spring holder extends from the first side wall in the second direction, and
    wherein the second spring holder extends from the inner surface of the second side wall in the second direction and is spaced from the first spring holder in the first direction; and
    wherein the second spring holder is the only element extending from the inner surface of the second side wall.

2. The operation apparatus according to claim 1, wherein a radial direction width of the return spring becomes greater than its expansion-compression direction length when compressed.

3. The operation apparatus according to claim 2, wherein the return spring is provided between the supporting element and the operation element having its expansion-compression direction oriented in a tangent direction of a virtual arc about a rotation axis line of the operation element.

4. The operation apparatus according to claim 3, wherein the second side wall extends in a radial direction relative to the rotation axis line of the operation element.

5. The operation apparatus according to claim 4, wherein the supporting element is provided with a recess housing part of the return spring.

6. The operation apparatus according to claim 1,
    wherein the return spring extends in the second first direction between the first spring holder and the second spring holder.

7. The operation apparatus according to claim 1, wherein the return spring is compressed in the first direction, and wherein the first side wall and the second side wall are parallel to each other.

8. The operation apparatus according to claim 1, wherein the second spring holder has a first end connected to the second side wall and a second free end.

9. An operation apparatus comprising:
    a return spring that is a wave spring;
    a supporting element including:
        a first side wall opposing the return spring in a lateral direction; and
        a first spring holder; and
    an operation element including:
        an arm including:
            a basal end rotatably supported by the supporting element
            a second spring holder;
            a second side wall opposing the first side wall; and
            an acting element disposed at a tip of the arm,
    wherein the return spring is surrounded with the first spring holder, the second spring holder, the first side wall, and the second side wall,
    wherein the first side wall and the second side wall extend in a first direction and are spaced from each other in a second direction,
    wherein the first spring holder extends from the first side wall in the second direction, and
    wherein the second spring holder extends from the second side wall in the second direction and is spaced from the first spring holder in the first direction,
    wherein a radial direction width of the return spring becomes greater than its expansion- compression direction length when compressed,
    wherein the supporting element is a step-use stay fixed to a vehicle body frame of a saddled vehicle,
    wherein the step-use stay supports a step disposed on an outer side in a vehicle width direction of the step-use stay,
    wherein the step-use stay is provided with, on an inner side in the vehicle width direction of the step-use stay, a pedal shaft rotatably supporting the operation element being a brake pedal, and
    wherein the return spring is provided between the operation element and the step-use stay on the inner side in the vehicle width direction of the step-use stay.
    wherein the supporting element is a step-use stay fixed to a vehicle body frame of a saddled vehicle, the step-use stay supports a step disposed on an outer side in a vehicle width direction of the step-use stay, the step-use stay is provided with, on an inner side in the vehicle width direction of the step-use stay, a pedal shaft rotatably supporting the operation element being a brake pedal, and the return spring is provided between the operation element and the step-use stay on the inner side in the vehicle width direction of the step-use stay.

10. An operation apparatus comprising:

a supporting element;

an operation element including an arm whose basal end is rotatably supported by the supporting element and whose tip is provided with an acting element; and a return spring provided between the supporting element and the operation element, wherein the return spring being a wave spring is provided between a first spring holder provided at the supporting element and a second spring holder provided at the arm, wherein the supporting element is provided with a first side wall opposing the return spring in a lateral direction, wherein the arm is provided with a second side wall opposing the first side wall and surrounding the return spring in conjunction with the first spring holder, the second spring holder, and the first side wall, wherein the supporting element is a step-use stay fixed to a vehicle body frame of a saddled vehicle, wherein the step-use stay supports a step disposed on an outer side in a vehicle width direction of the step-use stay, wherein the step-use stay is provided with, on an inner side in the vehicle width direction of the step-use stay, a pedal shaft rotatably supporting the operation element being a brake pedal, and wherein the return spring is provided between the operation element and the step-use stay on the inner side in the vehicle width direction of the step-use stay.

* * * * *